US011930572B2

(12) United States Patent
Dederich et al.

(10) Patent No.: US 11,930,572 B2
(45) Date of Patent: Mar. 12, 2024

(54) SHARED POWER TOPOLOGY FOR LED LUMINAIRES

(71) Applicant: SIGNIFY HOLDING B.V., Eindhoven (NL)

(72) Inventors: George Albert Dederich, Syracuse, NY (US); Benjamin David Vollmer, Syracuse, NY (US); Isaac P. Dost, Syracuse, NY (US); Walten Peter Owens, Syracuse, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 255 days.

(21) Appl. No.: 17/609,688

(22) PCT Filed: May 15, 2020

(86) PCT No.: PCT/EP2020/063697
§ 371 (c)(1),
(2) Date: Nov. 8, 2021

(87) PCT Pub. No.: WO2020/234183
PCT Pub. Date: Nov. 26, 2020

(65) Prior Publication Data

US 2022/0225484 A1 Jul. 14, 2022

Related U.S. Application Data

(63) Continuation of application No. 16/414,963, filed on May 17, 2019, now Pat. No. 10,841,998.

(51) Int. Cl.
*H05B 45/37* (2020.01)
*H05B 45/10* (2020.01)
*H05B 45/48* (2020.01)
*H05B 45/50* (2022.01)

(52) U.S. Cl.
CPC ............ *H05B 45/37* (2020.01); *H05B 45/10* (2020.01); *H05B 45/48* (2020.01); *H05B 45/50* (2020.01)

(58) Field of Classification Search
None
See application file for complete search history.

(56) References Cited

U.S. PATENT DOCUMENTS 7,075,252 B1 7/2006 Blackwood
8,174,809 B2 5/2012 Sauerlander et al.
8,193,716 B2 6/2012 Chang
8,508,143 B2 8/2013 Okubo
8,674,621 B2 3/2014 Ge et al.
9,084,327 B2 7/2015 Chiu et al.
9,257,067 B2 2/2016 Zhang et al.
(Continued)

FOREIGN PATENT DOCUMENTS

WO 2017071301 A1 5/2017

*Primary Examiner* — Thomas J. Hiltunen

(57) ABSTRACT

A system for emitting light (such as a luminaire) includes a first light emitting diode (LED) string and a first LED driver that is electrically connected in parallel to the first LED string. The system also may include a second (or more) LED string(s), each associated with an additional LED driver. One-way conductors and normally-open switches are used so that if one LED driver fails, the remaining LED driver(s) will deliver power to the failed driver's LED string so that the light remains operational, but with a reduced brightness.

8 Claims, 5 Drawing Sheets

(56) References Cited

U.S. PATENT DOCUMENTS

| | | | | |
|---|---|---|---|---|
| 9,288,856 | B2 * | 3/2016 | Marchesin | H05B 45/44 |
| 9,301,356 | B2 * | 3/2016 | Hattrup | H05B 45/48 |
| 9,443,478 | B2 | 9/2016 | Min et al. | |
| 9,655,184 | B2 | 5/2017 | Guo et al. | |
| 9,660,535 | B2 | 5/2017 | Dearborn et al. | |
| 9,717,123 | B1 | 7/2017 | Yao | |
| 9,875,697 | B2 | 1/2018 | Kang et al. | |
| 9,924,574 | B1 | 3/2018 | Fernandez et al. | |
| 9,930,747 | B2 | 3/2018 | Manahan et al. | |
| 10,212,770 | B2 | 2/2019 | Guo et al. | |
| 10,334,676 | B2 | 6/2019 | Dost et al. | |
| 10,841,998 | B1 * | 11/2020 | Vollmer | H05B 45/52 |
| 10,999,909 | B2 * | 5/2021 | Sudhaus | H05B 45/52 |
| 2008/0276509 | A1 | 11/2008 | Yu | |
| 2008/0295371 | A1 | 12/2008 | Hsu | |
| 2009/0128045 | A1 * | 5/2009 | Szczeszynski | H05B 45/347 315/185 R |
| 2010/0283322 | A1 | 11/2010 | Wibben | |
| 2011/0068692 | A1 | 3/2011 | Tian et al. | |
| 2012/0306387 | A1 * | 12/2012 | Ferguson | H05B 45/52 315/185 R |
| 2014/0169037 | A1 | 6/2014 | Berard et al. | |
| 2015/0173143 | A1 | 6/2015 | Zhang et al. | |
| 2016/0255687 | A1 | 9/2016 | Zhang et al. | |
| 2017/0245328 | A1 | 8/2017 | Moon et al. | |
| 2018/0338358 | A1 | 11/2018 | Dost et al. | |
| 2018/0376555 | A1 | 12/2018 | Wang | |
| 2019/0069381 | A1 | 2/2019 | Cho et al. | |
| 2020/0077477 | A1 | 3/2020 | Kessels | |
| 2021/0306387 | A1 | 9/2021 | Smith et al. | |

* cited by examiner

SHARED POWER TOPOLOGY FOR LED LUMINAIRES

CROSS-REFERENCE TO PRIOR APPLICATIONS

This application is a U.S. National Phase application under 35 U.S.C. § 371 of International Application No. PCT/EP2020/063697, filed on May 15, 2020, which claims the benefit of priority as a Continuation of U.S. application Ser. No. 16/414,963, filed on May 17, 2019. These applications are hereby incorporated by reference herein.

BACKGROUND

Light emitting diode (LED) luminaires typically include an LED source or multiple sets of LEDs connected together. LEDs are typically designed to run on low voltage, such as 12-24V, direct current (DC) electricity. For this reason, LED luminaires will have one or more LED drivers. LED drivers, which are sometimes also referred to as LED power supplies, are circuits that convert power from a relatively higher line voltage (such as 120V or 220V) alternating current (AC) source into low voltage direct current. In addition to rectifying AC current to DC current, LED drivers protect LEDs from current and voltage fluctuations caused by variabilities in the power source. LED drivers may be integral with an LED luminaire, or they may be external to the luminaire and electrically connected between an external power supply and the LEDs.

In a typical LED luminaire, multiple drivers are needed to provide power to multiple LED strings or sources. However, when an LED source or string is powered by a single driver, failure of that driver causes a corresponding failure of the driver's associated LED source or string.

This document describes methods and systems that are directed to solving at least some of the issues discussed above.

SUMMARY

In an embodiment, a system for emitting light includes a first light emitting diode (LED) string of one or more LEDs that are electrically connected in series, and also a first LED driver that is electrically connected in parallel to the first LED string. The system also includes a first one-way conductor having an input that that is electrically connected to an output of the first LED driver, and an output that is electrically connected to an input of the first LED string. The system also includes a second LED driver that is electrically connected in parallel to the first LED string. The system also includes a second one-way conductor having an input that that is electrically connected to an output of the second LED driver, along with an output that is electrically connected to an input of the first LED string.

Optionally, this system may include a second LED string of one or more LEDs that are electrically connected in series. If so, the second LED string will be electrically connected in parallel to each of the first LED string, the first LED driver, and the second LED driver. A switch may be electrically connected between the inputs of the first LED string and the second LED string, The switch will be configured to: (i) when neither of the LED drivers is failing, open a first electrical connection between the first LED driver and the second LED string, and open a second electrical connection between the second LED driver and the first LED string; and (ii) when either the first or the second LED driver is failing, close the first and second electrical connections.

In another embodiment, a system for emitting light includes a first LED string of one or more LEDs that are electrically connected in series, a first LED driver that is electrically connected in parallel to the first LED string, and a first one-way conductor. The first one-way conductor includes an input that that is electrically connected to an output of the first LED driver, and an output that is electrically connected to an input of the first LED string. The system also includes a second LED string of one or more LEDs that are electrically connected in series, a second LED driver that is electrically connected in parallel to the second LED string, and a second one-way conductor. The second one-way conductor includes an input that that is electrically connected to an output of the second LED driver, and an output that is electrically connected to an input of the second LED string. A switch, in this example a normally-open switch, is electrically connected between the inputs of the first LED string and the second LED string. When neither of the LED drivers is failing, the normally-open switch will not electrically connect the first LED driver to the second LED string, nor will it electrically connect the second LED driver to the first LED string. When either the first or the second LED driver is failing, the normally-open switch will close and electrically connect the output of the first LED driver, the input of the first LED string, the output of the second LED driver and the input of the second LED string.

In another embodiment, a system for emitting light includes: a first LED string of one or more LEDs that are electrically connected in series; a first LED driver that is electrically connected in parallel to the first LED string; and a first voltage sensor positioned to measure voltage in a conductive path between the first LED driver and the first LED string. The system also includes: a second LED string of one or more LEDs that are electrically connected in series; a second LED driver that is electrically connected in parallel to the second LED string; and a second voltage sensor positioned to measure voltage in a conductive path between the first LED driver and the first LED string. The system also includes a first switch, preferably a normally open switch, that is configured to close and positioned to create a conductive path between the first LED driver and the second LED string when the voltage measured by the first voltage sensor is more than a threshold level above the voltage measured by the second voltage sensor. The system also includes a second switch, preferably a normally open switch, that is configured to close and positioned to create a conductive path between the second LED driver and the first LED string when the voltage measured by the second voltage sensor is more than a threshold level above the voltage measured by the first voltage sensor. Optionally, in this embodiment each of the normally open switches may include a field effect transistor.

In any of these embodiments, each of the one-way conductors may include, for example, a field effect transistor or a diode. The LED string(s) may be components of an LED luminaire. The LED drivers also may be components of the LED luminaire, or the LED drivers may be positioned external to the LED luminaire.

Optionally, a first current sensor may be positioned to detect current in a conductive path between the first LED driver and the first LED string, and a second current sensor may be positioned to detect current in a conductive path between the second LED driver and the second LED string.

If so, each of the current sensors may trigger closure of the normally-open switch upon detection of an undercurrent condition.

Optionally, the system may include an optical sensor that is configured to measure brightness of light emitted by one or more of the LED strings. The optical sensor may be configured to trigger closure of the normally-open switch upon detection that an LED string's brightness is lower than a threshold level.

Optionally, the system may include a temperature sensor that is configured to measure temperature in a vicinity of one or more of the LED strings. The temperature sensor may be configured to trigger closure of the normally-open switch upon detection that the temperature that is lower than a threshold level.

DETAILED DESCRIPTION

Terminology that is relevant to this disclosure includes:

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, the terms "lighting device," "light fixture," "luminaire" and "illumination device" are used interchangeably to refer to a device that includes a source of optical radiation such as one or more light emitting diodes (LEDs), light bulbs, ultraviolet light or infrared sources, or other sources of optical radiation. A lighting device will also include a housing, one or more electrical components for conveying power from a power supply to the device's optical radiation source, and optionally control circuitry. An "LED luminaire" is a lighting device that includes LEDs as an optical radiation source.

In this document, the term "electrically connected" means, with respect to two or more components, that a conductive path exists between the components so that electric current can flow from one of the components to the other, either directly or through one or more intermediary components.

Figure 1:
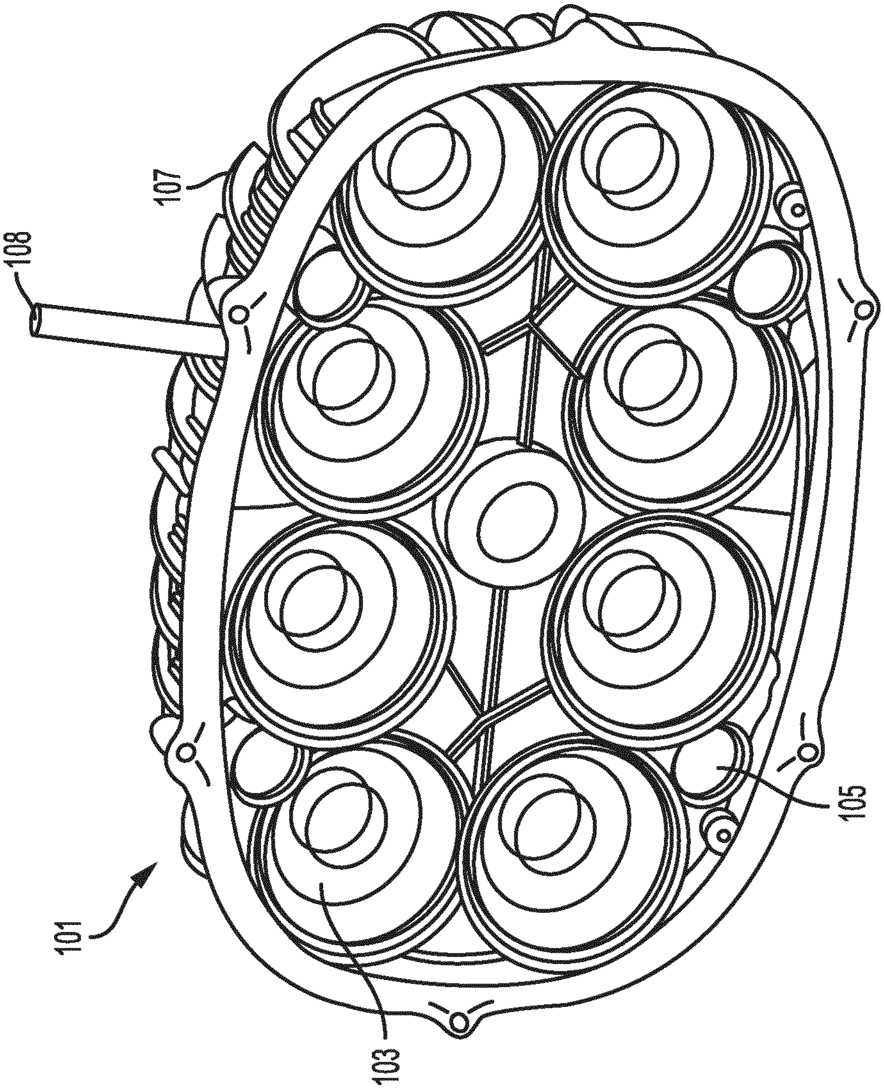
FIG. 1 PRIOR ART
FIG. 1 illustrates an example LED luminaire such as may exist in the prior art.

Referring to FIG. 1, an example lighting device 101 such as that which may exist in the prior art may include an optical radiation source, such as any number of lighting modules that include LEDs. In various embodiments, lighting device 101 will include a number of LED modules 103, 105 sufficient to provide a high intensity LED device. The lighting device 101 may include a housing 107 that holds electrical components such as a fixture controller, a power source, and wiring and circuitry to supply power and/or control signals to the LED modules. The lighting device 101 also may include communication components 108 such as a transceiver and antenna.

Figure 3:
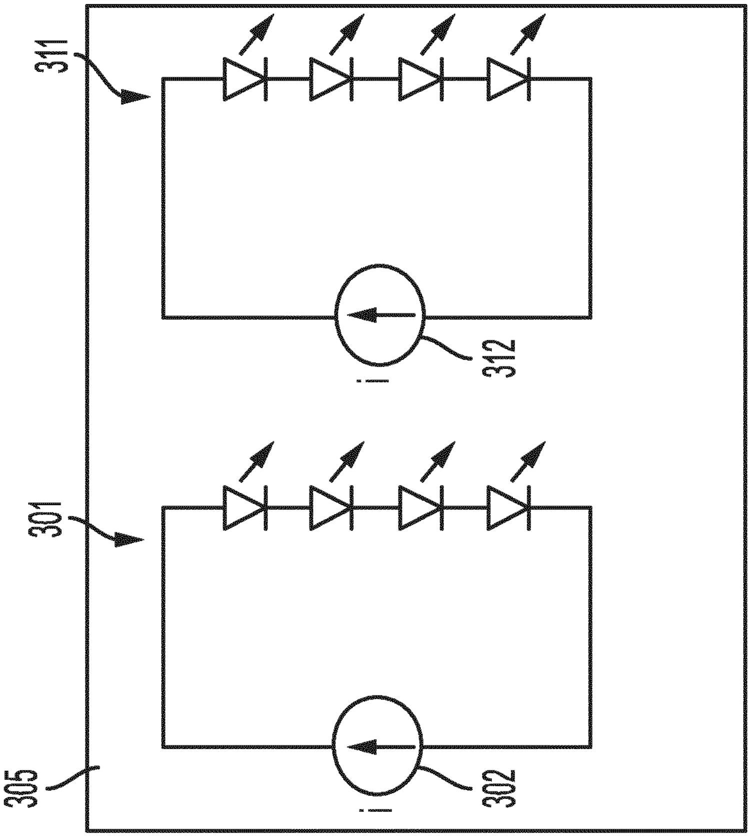
FIG. 3 PRIOR ART
FIGS. 2 and 3 illustrate common LED driver topologies as may exist in the prior art.
Figure 2:
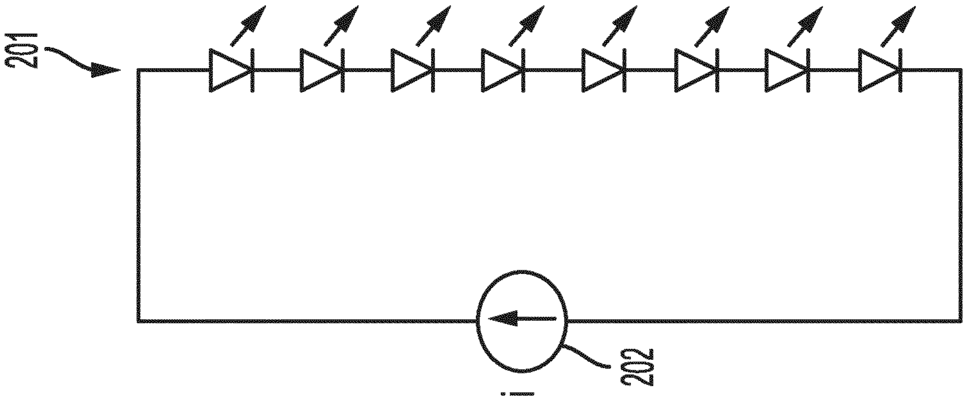
FIG. 2 PRIOR ART

FIG. 2 illustrates a common topology for LED drivers of an LED luminaire as may exist in the prior art. As shown, an LED string 201 includes any number of LEDs electrically connected to each other in series. An LED driver 202 is electrically connected in parallel to the LED string 201 to provide power to the LED string 201. An example LED driver is disclosed in U.S. Pat. No. 7,075,252 ("LED Driver Circuit"), the disclosure of which is incorporated into this document by reference. FIG. 3 illustrates that in the prior art, an LED luminaire (represented by box 305) may include multiple LED strings 301, 311, each of which is powered by its own independently associated LED driver 302, 312. As noted in the background section of this patent document, a problem with this topology is that when a driver 302 fails, all of the LEDs in its associated LED string 301 will lose power and will go dark. In general, LED drivers have a limited lifespan and eventually need to be replaced. Thus, all LED luminaires that include the driver circuit topology shown in FIG. 3 will eventually require maintenance to replace LED drivers that have reached end-of-life.

Figure 4:
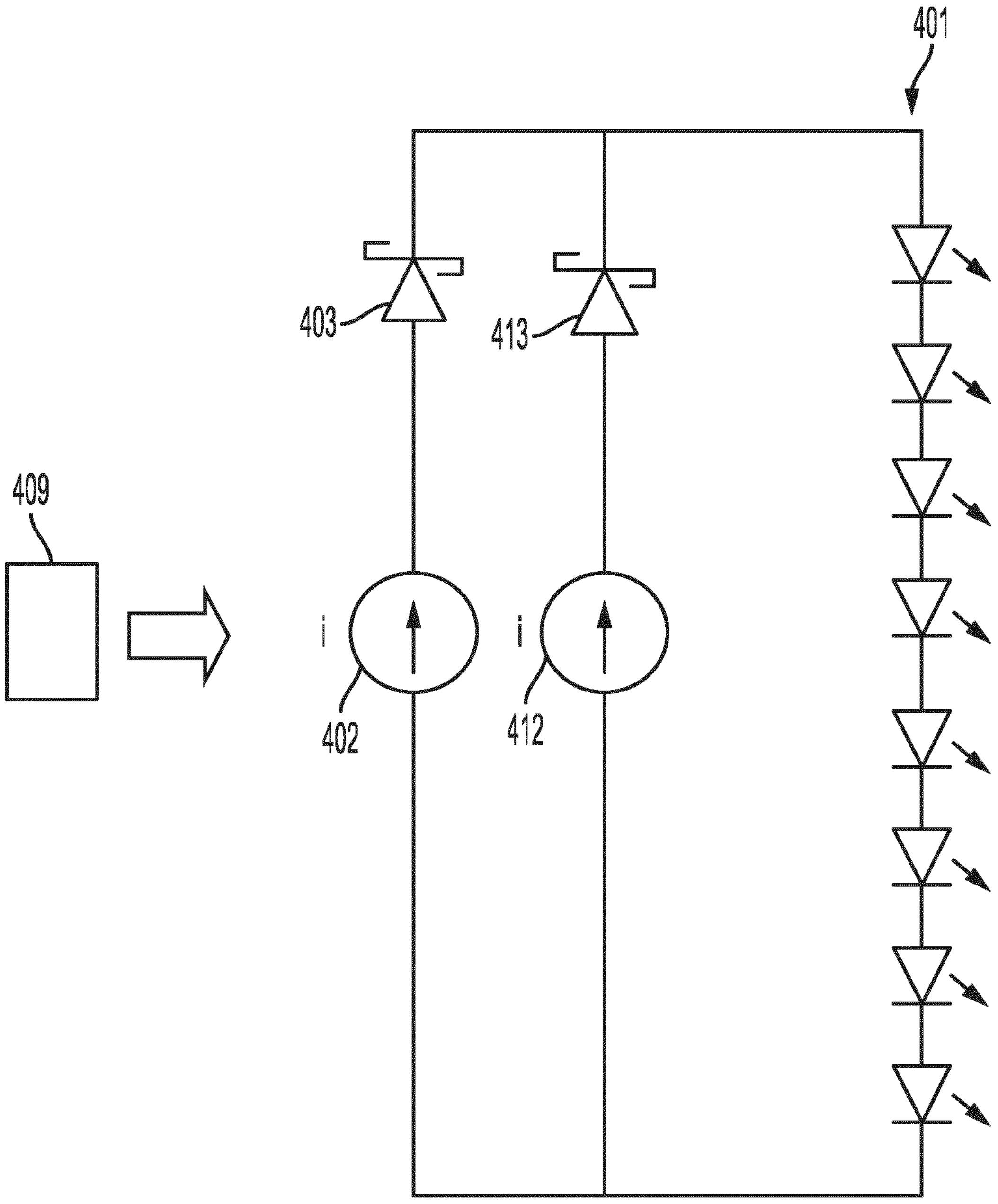
FIG. 4 illustrates a first embodiment of an LED driver topology according to the present disclosure.

FIG. 4 illustrates an example LED driver circuit topology that helps address the problems described above. In FIG. 4, an LED string 401 is electrically connected to two or more LED drivers 402, 412. The LED drivers may be of either the constant current type or the constant voltage type, although if the driver is of the constant voltage type it may have additional circuitry that causes it to have a constant current. The brightness of the LEDs is controlled by an external controller 409 that includes a processor and an output that directs a signal to each driver which causes the amplitude of the current to vary, or that causes the brightness of the emitted light to dim due to pulse width modulation. Each LED driver will generate an output current that is responsive to the signal of the controller. The brightness of the LEDs in the LED string 401 will vary with amplitude of the output current. The LED drivers 402, 412 are electrically connected to the LED string 401 in parallel so that if one of the LED drivers (such as 402) fails, the other LED driver (in this example, 412) may still provide power to the LED string 401. Thus, in the absence of a failure both drivers 402, 412 will drive the LED string 401. However, if one of the drivers 402 or 412 fails, the total current delivered to the LED string 401 will be reduced, and the effective brightness of light emitted by the LED string 401 also will therefore be reduced. However, all LEDs in the LED string 401 will still operate.

The output of each LED driver 402, 412 may be electrically connected to a one-way conductor 403, 413 such as a field effect transistor (FET) or diode (such as a Schottky diode) that only permits current to flow in a single direction from the driver to the LED string, and not in the reverse direction. If one of the drivers should fail, the driver's associated one-way conductor 403, 413 will prevent total system failure by ensuring that current from the still-active driver is directed to the LEDs of the LED string 401 rather than to the failed driver.

The embodiments described above are not limited to topologies with two LED drivers. Any number of two or more drivers may be available in parallel to drive the LED string 401 in the embodiment of FIG. 4.

Figure 5A:
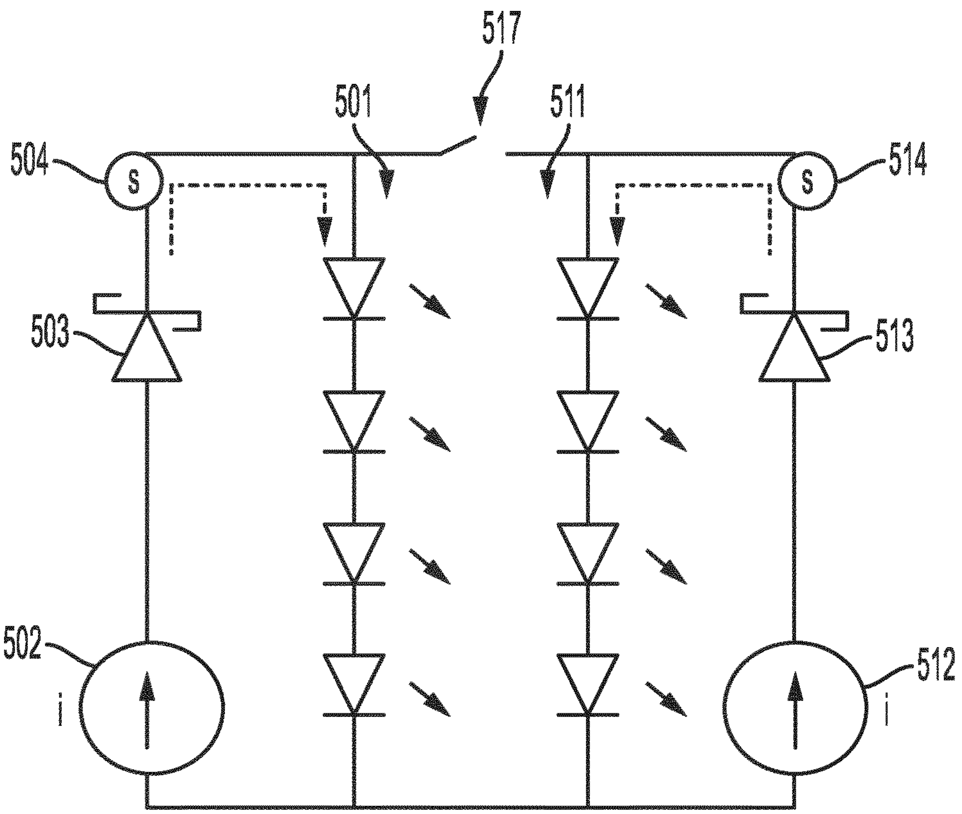
FIGS. 5A and 5B illustrate a second embodiment of an LED driver topology according to the present disclosure.
Figure 5B:
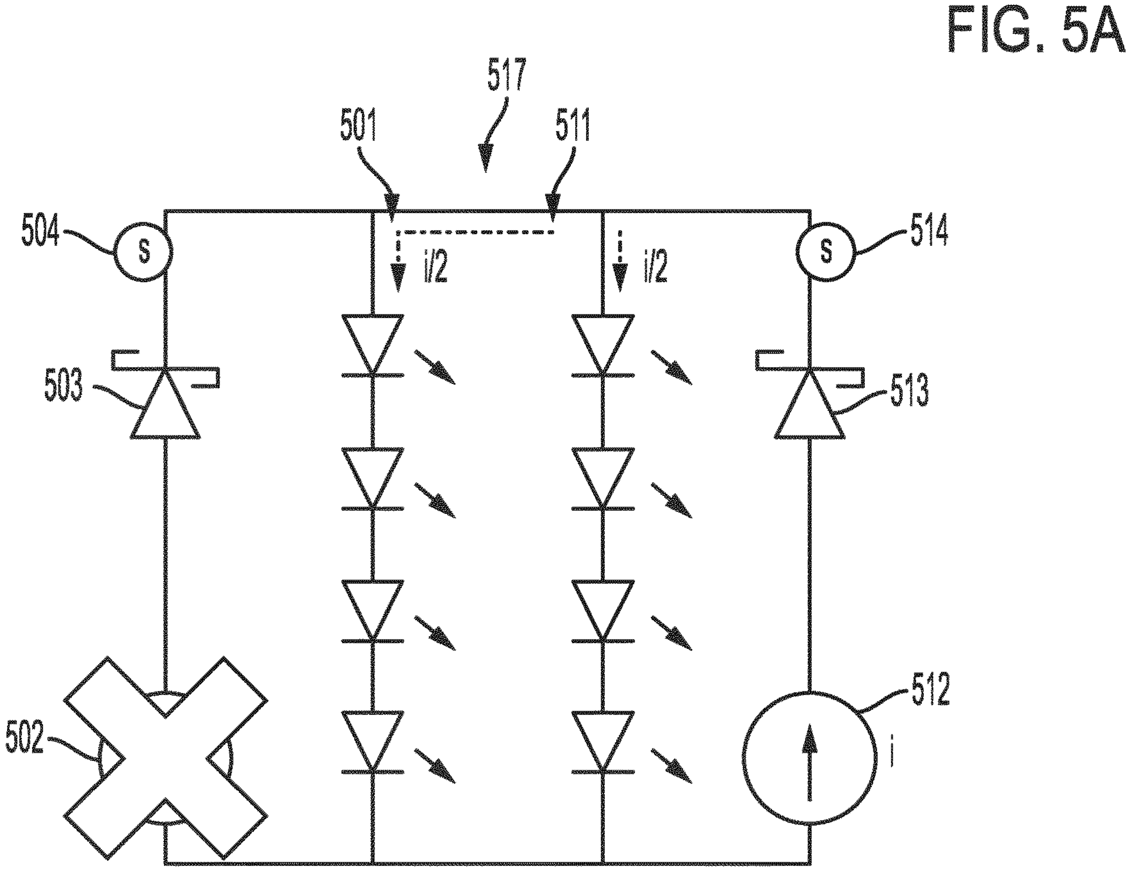

FIGS. 5A and 5B illustrate an alternate embodiment in which two or more LED drivers 502, 512 are collectively associated with two or more LED strings 501, 511, each in a parallel electrical connection. FIG. 5A illustrates that during normal operation a first LED driver 502 will provide power to the first LED string 501, while the second LED driver 512 will provide power to the second LED string 511. A switch 517 will be electrically positioned between the power inputs of the first LED string 501 and the second LED string 511, and the switch 517 is a normally open switch that will be open during normal operation of the circuit (that is, when none of the drivers has failed), this electrically separating the LED string/driver pair 501/502 from the other LED string/driver pair 511/512.

As with the embodiment of FIG. 4, in FIGS. 5A and 5B the output of each LED driver 502, 512 is electrically connected to a one-way conductor 503, 513 such as a FET or diode (such as a Schottky diode) that only permits current to flow in a single direction from the driver to the LED string(s), and not in the reverse direction. However, as shown in FIG. 5B, if one of the drivers 502 should fail, the switch 517 will close and both LED strings 501, 511 will be pulled in parallel and driven by the non-failing driver 512. In this situation the current of the non-failing driver 512 will be split between the two LED strings 501, 511, thus reducing the brightness of each string by approximately 40%, but each string will remain lit.

Additional redundant drivers could be provided for one or more of the LED strings so that more of the brightness is maintained (i.e., there is less than a 40% brightness reduction) if one of the LED drivers should fail.

The switch 517 will close upon failure of either LED driver, either by passive or active detection. For active detection, each section (LED driver/LED string pair) of the circuit, or another component in or near the luminaire, may include a sensor 504, 514 that can detect failure of an LED driver. For example, if the sensor is current sensor, upon detection that current is no longer flowing from an LED driver or upon detection that an LED driver's output current is below a lower threshold, the sensor may trigger the switch 517 to close. Or, the sensors for each section may be voltage sensors, and the detection of at least a threshold difference in voltage between the two sensors may trigger the switch to close. Alternatively, the sensor may be a temperature sensor that detects the temperature of an LED string; if so, the temperature sensor may trigger closure of the switch 517 if the temperature sensor detects that an LED string's temperature has dropped below a threshold level. Alternatively, the sensor may be an optical sensor that detects the brightness of light output by an LED string; if so, the optical sensor may trigger closure of the switch 517 if the optical sensor detects that an LED string's brightness (such as may be measured by lumens output) dropped below a threshold level. Other types of sensors may be used in various embodiments. These thresholds may be moderated by a condition of whether the light is powered on at all, or the system may include a processor and programming instructions that cause the sensor only to trigger closure of the switch when a failure condition is detected and the luminaire is powered on for normal operation.

The embodiment described above in FIGS. 5A and 5B are not limited to topologies with two LED strings and two drivers. Any number of LED string/driver pairs may be connected in parallel, each separated from adjacent pairs by a normally-open switch. If so, then the sensor that is associated with each driver may trigger closure of the switch (or switches) that are adjacent to the failing LED driver's circuit. In addition, the embodiments of FIGS. 4 and 5A-5B may be combined so that any LED string/driver pair in the topology of FIGS. 5A-5B may include multiple LED drivers that are electrically connected in parallel to a single LED string, thus providing an LED string/driver pair with redundant drivers that is also electrically connected to one or more additional LED string/driver pair via a normally-open switch.

Figure 6:
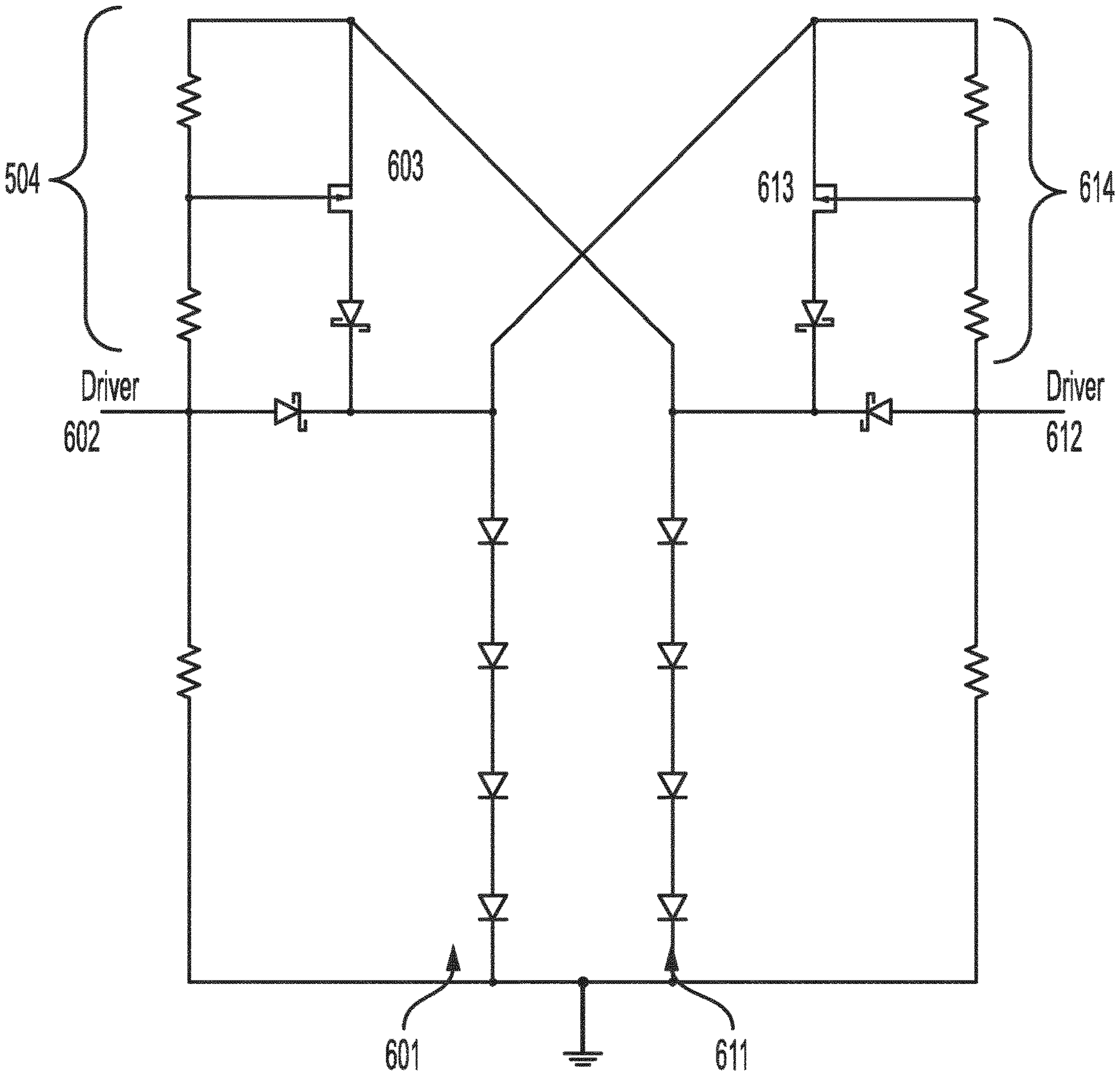
FIG. 6 illustrates a third embodiment in which switching is triggered by a substantial difference in voltage in the two circuit sections.

FIG. 6 illustrates an embodiment in which the sensors 604, 614 are voltage sensors. As noted above, in an embodiment such as this the detection of at least a threshold difference in voltage between the two sensors may trigger the switch to close. In this situation each of the FETs 603 and 613 will be a normally open switch. The first FET 603 is normally open, If the voltage across the voltage sensor 604 of the first section (in this case, biasing resistors) is more than a threshold amount more than the voltage across the second section's voltage sensor 614 (biasing resistors), the first section's FET 603 will turn on to create a conductive path between the first LED driver 602 and the second LED string 612 so that power from the first LED driver 602 is directed not only to the first LED string 601 but also to the second LED string 611. Similarly, if the voltage across the voltage sensor 614 (biasing resistors) of the second section is at least a threshold amount more than the voltage across the first section's voltage sensor 604 (biasing resistors), the second section's normally open switch (such as FET 613) will turn on and create a conductive path between the second LED driver 612 and the first LED string 601 so that power from the second LED driver 612 is directed not only to the second LED string 611 but also to the first LED string 601. The variation of FIG. 6 may be combined with those of FIG. 4 or FIGS. 5A-5B by, for example, providing a parallel redundant driver with switch for either of the LED drivers 602, 612.

The embodiments described above may be installed and included in the circuitry of an individual luminaire. Alternatively, some of the components, such as the buck driver and/or controller, may be part of a control system that is external to the luminaire.

Examples of luminaires and control systems that the embodiments disclosed above may be used in include, for example, those described in U.S. Pat. No. 9,188,307, titled "High Intensity LED Illumination Device with Automated Sensor-Based Control"; U.S. Pat. No. 9,730,302, titled "System and Method for Control of Illumination Device"; and U.S. Pat. No. 9,800,431, titled "Controllers for Interconnected Lighting Devices", the disclosures of which are all fully incorporated into this document by reference.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for emitting light, the system comprising:

a first light emitting diode (LED) string comprising one or more LEDs that are electrically connected in series;

a first LED driver that is electrically connected in parallel to the first LED string;

a first voltage sensor positioned to measure voltage in a conductive path between the first LED driver and the first LED string;

a second LED string comprising one or more LEDs that are electrically connected in series;

a second LED driver that is electrically connected in parallel to the second LED string;

a second voltage sensor positioned to measure voltage in a conductive path between the second LED driver and the second LED string;

a first switch that is configured to close and positioned to create a conductive path between the first LED driver and the second LED string when the voltage measured by the first voltage sensor is more than a threshold level above the voltage measured by the second voltage sensor; and a second switch that is configured to close and positioned to create a conductive path between the second LED driver and the first LED string when the voltage measured by the second voltage sensor is more than a threshold level above the voltage measured by the first voltage sensor.

2. The system of claim 1, wherein each of the first switch and the second switch comprises a field effect transistor.

3. The system of claim 1, wherein the first switch creates the conductive path between the first LED driver and the second LED string to provide power from the first LED driver to the first LED string and the second LED string.

4. The system of claim 1, wherein the second switch creates the conductive path between the second LED driver and the first LED string to provide power from the second LED driver to the second LED string and the first LED string.

5. The system of claim 1, further comprising an optical sensor that is configured to measure brightness of light emitted by one or more of the LED strings, and wherein the optical sensor is configured to trigger closure of the switch upon detection that an LED string's brightness is lower than a threshold level.

6. The system of claim 1, further comprising a temperature sensor that is configured to measure temperature in a vicinity of one or more of the LED strings, and wherein the temperature sensor is configured to trigger closure of the switch upon detection that the temperature that is lower than a threshold level.

7. The system of claim 1, wherein the first voltage sensor includes biasing resistors.

8. The system of claim 1, wherein the second voltage sensor includes biasing resistors.

* * * * *